Patented June 26, 1923.

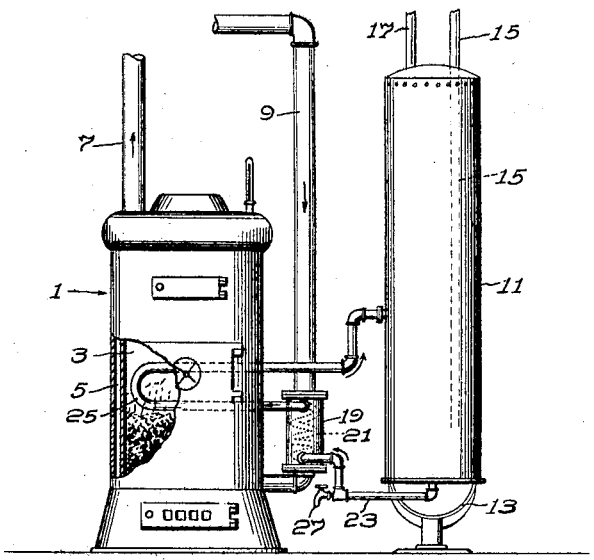
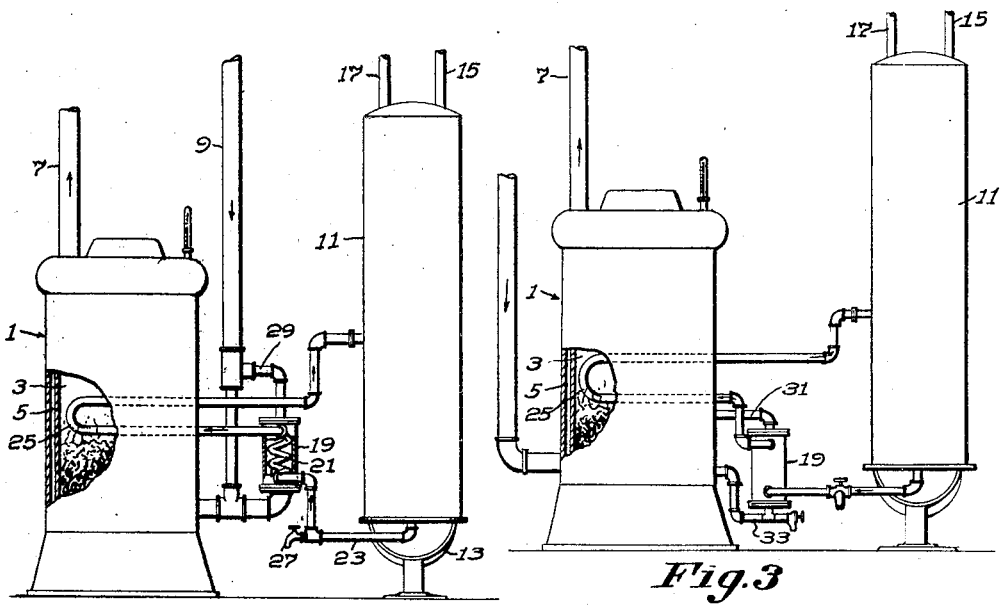
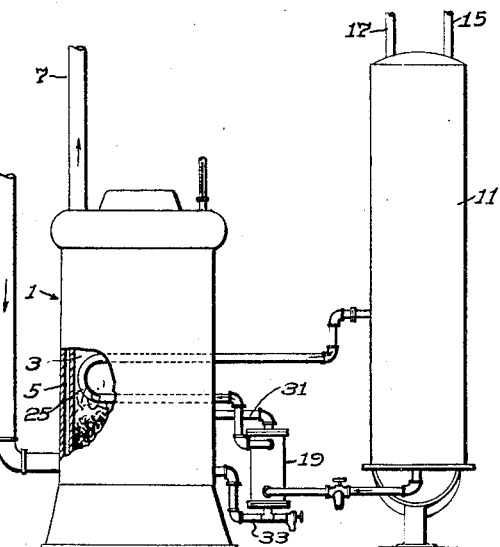

1,460,042

UNITED STATES PATENT OFFICE.

WALTER S. SMITH, OF FOXBORO, MASSACHUSETTS.

WATER-HEATING APPARATUS.

Application filed February 9, 1923. Serial No. 618,130.

*To all whom it may concern:*

Be it known that I, WALTER S. SMITH, a citizen of the United States, residing at Foxboro, in the county of Norfolk and State of Massachusetts, have invented certain new and useful Improvements in Water-Heating Apparatus, of which the following is a specification.

The invention to be hereinafter described relates to apparatus for heating water, and more particularly to a simple, cheap and efficient apparatus for heating the water in a storage tank by heat taken from a hot water heating system, such, for example, as is usually employed for heating houses.

Such a hot water heating system comprises a heater having a fire-box, and a chamber adapted to receive water which is conducted from the heater through a flow pipe to the radiators, and is conducted from the radiators through a return pipe back to the heater, so that the water is kept in circulation through the heater and the pipes and radiators.

The temperature of the water in the storage tank fluctuates, due to variations in the demand of water therefrom and due to variations in the heating effect of the heater. One of the purposes of the present invention, therefore, is to provide apparatus which will tend to maintain the temperature of the water in the tank within certain limits. The construction is such that if the temperature of the water in the tank rises higher than the temperature of the water in the return pipe, the latter will tend to lower the temperature of the water in the tank; and on the other hand, if the temperature of the water in the return pipe is higher than the temperature of the water in the tank, the return pipe water will tend to raise the temperature of the water in the tank.

With the aforesaid and other purposes in view, the character of the invention will be best understood by reference to the following description of embodiments thereof shown in the accompanying drawing, wherein:

Fig. 1 is an elevation of a hot water heater, a water storage tank, and apparatus for heating the water in the tank embodying the invention, a portion of the shell of the hot water heater being broken away to disclose parts within the heater;

Fig. 2 is a similar view of a modified form of apparatus embodying the invention; and Fig. 3 is a similar view of still another embodiment of the invention.

Referring to the drawing, 1 (Fig. 1) designates a hot water heater provided with the usual ash pit, grate and a fire-box 3. The shell of the heater is made hollow to provide a chamber 5 surrounding the fire-box and adapted to receive water.

A flow pipe 7 conducts the hot water from the heater to the usual radiators, and a return pipe 9 conducts the water from the radiators back to the heater and communicates with the water chamber 5 adjacent the lower end thereof.

A hot water storage tank or container 11 of usual construction is mounted on a base 13 and has a pipe 15 for conducting cold water to the tank and a pipe 17 for conducting hot water from the tank.

The apparatus for heating the water in the tank, in the embodiment illustrated in Fig. 1, comprises a casing 19 which is interposed in the return pipe 9. Mounted in this casing is a coil 21 of copper or other suitable material. The lower end of this coil is connected to the tank 11 by a pipe 23, and the upper end of the coil is connected to a pipe 25 which is entered into the combustion chamber of the heater, has a reverse bend and extends outward from the heater to the storage tank. A faucet 27 may be provided in the pipe 23 to enable the water to be drawn from the storage tank, coil 21 and pipes 23 and 25.

In operation, the hot water circulating through the return pipe surrounds the coil 21 in the casing 19, and preliminarily heats the water in said coil. The water is further heated in passing through the portion of the pipe 25 which is subjected to the heat in the fire-box. This heating of the water in the coil and pipe 25, causes the water to circulate from the lower end of the tank through the pipe 23 up through the coil 21, through the pipe 25, and back to the tank.

For example, if the temperature of the water at the bottom of the tank is 50° F., and the temperature of the water in the return pipe is 120°, the temperature of the water on leaving the coil 21 will be raised to about 100°, and the temperature of the water after passing through the pipe 25 to the tank, will be raised to about 140°.

After the water in the tank has been thus heated for several hours, if no hot water is drawn from the tank, the temperature of the water at the bottom thereof may be about 160°. Under these conditions the effect of the return water passing through the casing about the coil is to lower the temperature of the water in the coil. For example, if the temperature of the return water remains about 120°, the temperature of the water after leaving the coil will be about 140°, and the temperature of the water after passing through the pipe 25 to the tank will be about 180°. Thus, the construction and arrangement of the apparatus are such that it not only raises the temperature of the water in the tank under certain conditions, but also lowers the temperature of the water in the tank under other conditions. As a consequence, the effect of the apparatus is to tend to keep the temperature of the water in the tank within certain limits, and prevent the water from becoming too hot or too cold.

Under certain conditions the temperature of the water in the storage tank may be higher than the temperature of the water circulating through the chamber of the heater. For example, this condition will exist when the demand for water stored in the tank has been small, and the fire in the fire-box of the water heater has died down to such a point that the temperature of the water in the chamber is lower than the temperature of the water in the tank. As a consequence, the hot water circulating from the tank through the coil and back to the tank, will tend to raise the temperature of the water flowing through the return pipe into the heater chamber.

The embodiment of the apparatus shown in Fig. 2 is similar to the embodiment already described, with the exception that instead of interposing the casing 19 directly into the return pipe 9, it is interposed in a by-pass pipe 29, which is connected to the return pipe. This arrangement is desirable when the location of the return pipe is such that it would not be convenient to interpose the casing directly therein.

The embodiment shown in Fig. 3 is similar to the embodiments already described, with the exception that the coil containing casing is not interposed in the return pipe, but the upper end of the casing is connected by a pipe 31 to the water chamber 5, and the lower end of the casing is connected by a pipe 33 with said water chamber at a point adjacent the bottom of the heater. The construction is such that the water in the lower portion of the chamber 5 may circulate through the pipes 31 and 33 and through the casing to raise or lower the temperature of water in the coil in a manner similar to that above described.

By my invention, a simple and efficient apparatus is provided for heating the water in the tank, the preliminary heating effect being obtained by the hot water returned to the heater, and the further heating effect being obtained as the water passes through the pipe which is subjected to the heat in the fire-box. Also, the construction is such that the return water may serve to raise or lower the temperature of the water in the tank, depending on whether or not the temperature of the water in the tank is lower or higher than the temperature of the return water.

It will be understood that the invention is not limited to the specific embodiments shown, and that various deviations may be made therefrom without departing from the spirit and scope of the appended claims.

What is claimed is:—

1. The combination of a hot water heater having a fire-box, a water chamber and pipes for conducting water to and from said chamber; a water storage tank, a casing interposed in the pipe for conducting water to the heater chamber, a coil in said casing, a pipe connecting one end of the coil with the tank, and a pipe leading from the opposite end of the coil into the fire-box and thence from the latter to the tank, that the water may circulate from the tank through the coil and the pipes associated therewith, to be preliminarily heated by the water passing through the casing, and further heated by the fire in the fire-box.

2. The combination of a hot water heater having a fire-box, a water chamber and flow and return pipes respectively for conducting water from and to said chamber; a water storage tank, means for conducting water from the tank into the fire-box and thence back to the tank, and means located between the heater and tank for subjecting the conducting means to the heat of the water returned to the heater, the portion of the conducting means in the fire-box being exposed to the direct heat from the fire therein.

3. The combination of a hot water heater having a fire-box and flow and return pipes; a water storage tank, a casing adapted to receive water circulating through the heater, a pipe leading from the tank through the casing into the fire-box and thence from the heater back to the tank, for subjecting the water in the pipe to the heat of the returned water passing through the casing and to the direct heat of the fire in the fire-box.

4. The combination of a hot water heater having a fire-box, and flow and return pipes adapted respectively to conduct water from the heater to radiators and to return water from the radiators to the heater; a water storage tank, and means for varying the temperature of the water in the tank including water conducting means extending from the lower part of the tank through the path of the returned water and through the fire-box back to the tank, said water conducting means including a portion exposed to the direct heat of the fire in the fire-box.

5. The combination of a hot water heater having a fire-box, a water chamber and flow and return pipes adapted respectively to conduct water to and from the water chamber; a water container, and means to conduct water extending from the container through the fire-box back to the container and having a portion in the path of water circulating through the chamber, and a portion exposed to the direct heat of the fire in the fire-box.

6. The combination of a hot water heater having a fire-box, a water chamber and flow and return pipes adapted respectively to conduct water from and to the water chamber; a water storage tank, means for subjecting water flowing from the tank to the direct heat of the fire in the fire-box, and means for subjecting water flowing from the tank to the indirect heat of the water flowing through the water chamber and said pipes.

7. The combination of a hot water heater having a fire-box and means for conducting water for heating purposes; a water storage tank, and means for conducting water from the storage tank into the fire-box and back to the storage tank, that it may be subjected to the direct heat of the fire in the fire-box, said first water conducting means having provision for subjecting the water in the second conducting means indirectly to the heating or cooling effect of the water in the first water conducting means.

8. The combination of a hot water heater having a fire-box and means for conducting water for heating purposes; a water storage tank, a pipe for conducting the water from the tank through the fire-box and back to the tank, said pipe being arranged for raising or lowering the temperature of the water in the conducting means, depending on whether the temperature of the water in the tank is higher or lower than the temperature of the water in the conducting means.

9. The combination of a hot water heater having a fire-box, a water chamber and flow and return pipes adapted respectively to conduct water from and to the water chamber; a water storage tank, and means for heating the water in the storage tank from the direct heat of the fire in the fire-box and having provision for returning heat of the water stored in the tank to the water in said chamber if the temperature of the water in the tank is higher than that of the water in the chamber.

WALTER S. SMITH.